United States Patent Office 3,494,861
Patented Feb. 10, 1970

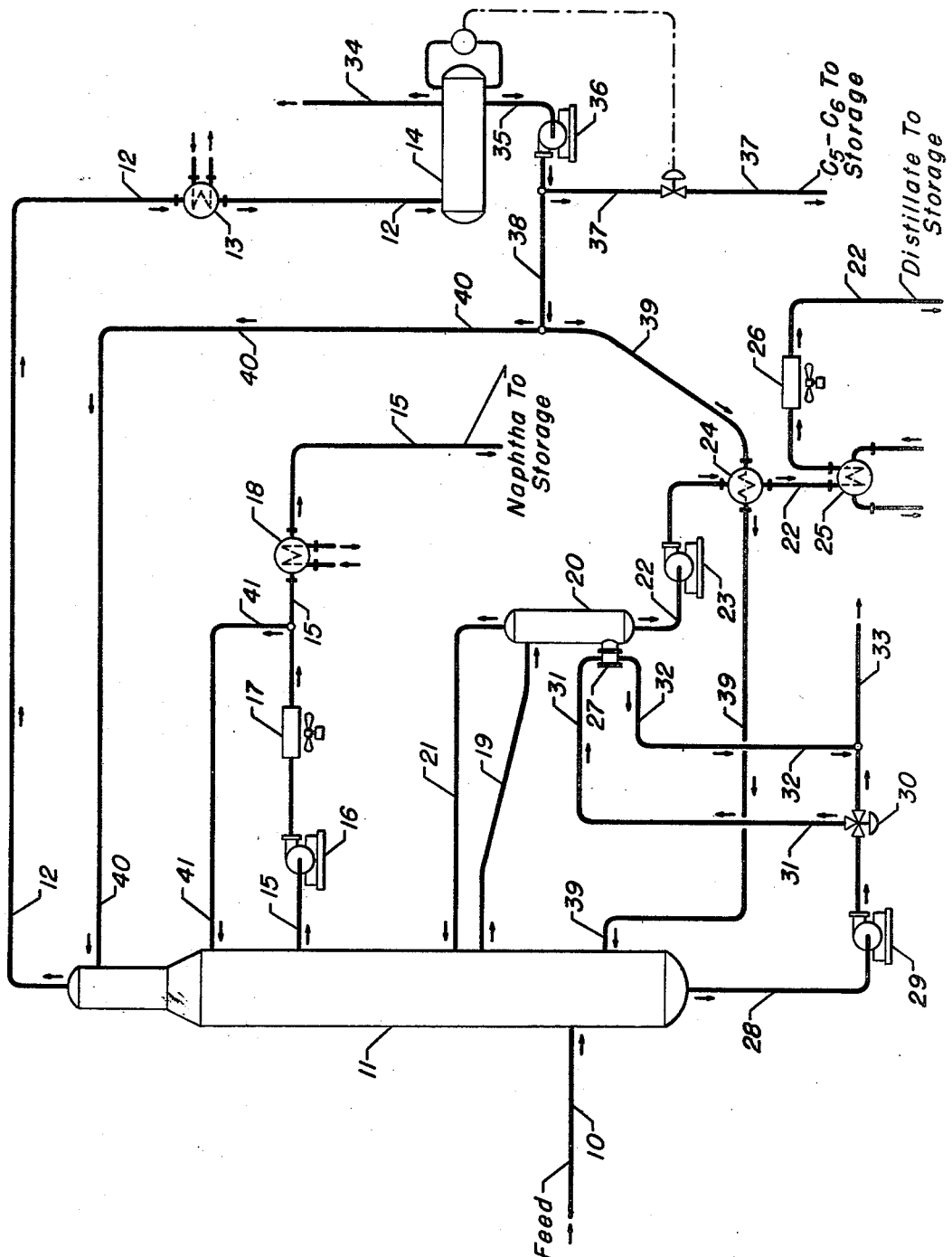

3,494,861
RECTIFICATION WITH CONDENSED OVERHEAD USED AS REFLUX AND STRIPPING GAS
William H. Munro, Deerfield, Ill., assignor to Universal Oil Products Company, Des Plaines, Ill., a corporation of Delaware
Filed June 7, 1968, Ser. No. 735,424
Int. Cl. C10g 7/00; B01d 3/14
U.S. Cl. 208—355      7 Claims

ABSTRACT OF THE DISCLOSURE

Method for distilling a debutanized hydrocarbon feed mixture. A light hydrocarbon fraction is utilized both as reflux and a stripping medium in the fractionating column.

BACKGROUND OF THE INVENTION

This invention relates to a fractionation method. It specifically relates to a method for distilling a debutanized hydrocarbon feed mixture under substantially anhydrous conditions. It specifically relates to a method for distilling a debutanized hydrocarbon feed mixture obtained as a portion of the effluent from a hydrocracking reaction zone.

The practice of distillation is widely used in the chemical and petroleum industries for separating and recovering desired products usually manufactured through chemical reaction or usually obtainable from raw materials, such as crude petroleum. It today's complex economy, it has become increasingly apparent that the chemical engineering tool of distillation must be further improved in order to make such operation more economically attractive.

Accordingly, the prior art schemes have developed various techniques of maintaining fractionating columns in thermal balance, such as dual internally located reboiler systems for obtaining carefully tailored boiling range products through the use of side-cut strippers, overhead charge, condensing systems, and the like, each of which is familiar to those skilled in the art. In virtually every prior art scheme there is embodied a desire for minimizing the cost of obtaining desirable and predetermined products from a multicomponent feed mixture. In many cases, the number of desired components makes it impractical to utilize a single fractionation column so the prior art schemes have generally resorted to a plurality of fractionators commonly called a "distillation train" in order to separate and recover such desired products.

In other cases, the boiling point difference between the lightest component and the heaviest component contained in a feed mixture requires the utilization again of a plurality of fractionators since otherwise the size and/or height of a fractionating column would become prohibitive. Those skilled in the art are familiar with the vastly different operating conditions which are required to fractionate normally gaseous hydrocarbons compared to those required to fractionate normally liquid hydrocarbons, such as naphtha and gas oil.

The prior art schemes also have utilized the known expedient of injecting steam into fractionating columns both for the purpose of reducing the hydrocarbon partial pressure so that vaporization may be achieved more easily and for the purpose of stripping. However, in dealing with mixed hydrocarbon feedstocks containing relatively light hydrocarbons and, in particular, the normally gaseous hydrocarbons, steam cannot be used since the overhead operating conditions are not sufficient to maintain the steam in a vapor state. Therefore, it becomes impractical to remove the water from the fractionating column if steam is used in such an environment.

Since the art of distillation is essential to the successful practice of chemical and petroleum processing, it would be desirable to further improve upon distillation methods.

Additionally, the chemical industry and, to a considerable extent, the petroleum industry have resorted to hydrogenation and, in particular, to hydrocracking techniques in an effort to upgrade from a unique standpoint various petroleum and chemical products. The broad hydrogenation reaction which includes the specific reaction of hydrocracking, of course, requires careful control of operating conditions as well as careful control of raw material quality and quantity. Furthermore, the hydrogenation reaction produces normally gaseous hydrocarbons in commercially significant quantities so that ultimate recovery of the $C_1$ to $C_4$ hydrocarbon has become increasingly attractive.

It is not unusual for the effluent from a hydrogenation reaction zone to contain not only unreacted hydrogen, but considerable quantities of normally gaseous hydrocarbons and normally liquid hydrocarbons, including liquids which have a boiling point in excess of 500° F. and in some cases, which have an end point above 1000° F. With material of this composition, the fractionation train becomes increasingly complicated. Since the recovery of normally gaseous hydrocarbons requires a frictionating column usually operating under pressure with refrigeration techniques to maintain these hydrocarbons in liquid phase for fractionation purposes, it is conventional to have stabilizing columns which remove up to gasoline boiling range materials in a series of columns and then subjecting the relatively heavy components of such an effluent to conventional atmospheric or superatmospheric distillation followed by vacuum distillation of the heavy residuum.

SUMMARY OF THE INVENTION

Accordingly, it is an object of this invention to provide an improved method for distillation.

It is another object of this invention to provide an improved method for distilling a debutanized hydrocarbon feed mixture having an end point about 500° F. under substantially anhydrous conditions in a facile and economical manner.

It is a specific object of this invention to provide an improved method for separating and recovering desired products from the hydrocarbon effluent of a hydrogenation reaction zone effluent.

Therefore, the practice of the present invention provides a method for distilling a debutanized hydrocarbon feed mixture having an end point above 500° F. under substantially anhydrous conditions which comprises: (a) introducing said feed mixture into a fractionating column maintained under distillation conditions including superatmospheric pressure and the presence of hereinafter specified stripping gas; (b) withdrawing an overhead gaseous fraction comprising $C_5$ and $C_6$ hydrocarbons at a temperature below the dew point of water; (c) withdrawing a side-cut fraction having an end point of about 500° F.; (d) withdrawing a bottoms fraction boiling mainly above about 500° F.; (e) condensing said overhead fraction; (f) passing a portion of said condensed fraction into the upper section of said condensed overhead fraction into the upper section of said column as reflux thereon; (g) passing a portion of said condensed overhead fraction into the lower section of said column as a source of stripping gas specified; and, (h) recovering the remaining portion of said condensed overhead fraction as a product stream.

A particular embodiment of this invention includes the method thereinabove wherein said feed mixture comprises a portion of the hydrocarbon effluent of a hydrocracking reaction zone.

Thus, in essence, it can be seen from the above embodiments that the present invention provides a method for distilling a hydrocarbon feed mixture containing components ranging from $C_5$ hydrocarbons to residuum having an end point above 500° F. According to this invention the feed mixture is separated in a single column under substantially anhydrous conditions utilizing a portion of the $C_5$ and $C_6$ hydrocarbons from the overhead product stream both as reflux on the column and as a source of stripping gas in the lower portion of the column.

The invention may be more fully understood with reference to the appended drawing which is a schematic representation of apparatus for practicing one embodiment of this invention.

DESCRIPTION OF THE DRAWING

Referring now to the drawing, a debutanized feed mixture comprising 15.2 mols per hour of normal butane, 28.1 mols per hour of isopentane, 31.2 mols per hour of normal pentane, 48 mols per hour of $C_6$ hydrocarbons, 25.1 mols per hour of cyclohexane, 141.7 mols per hour of a fraction boiling between $C_7$–290° F., 983.5 mols per hour of a fraction boiling between 310° F. and 525° F., and 247.6 mols per hour of material boiling above 525° F. having an end point of about 1025° F. is introduced into the system via line 10 having been preheated by conventional means not shown and passed into fractionator column 11 at a temperature of about 575° F.

Suitable operating conditions are maintained in fractionator 11 to produce as an overhead fraction $C_5$ and $C_6$ hydrocarbons which are withdrawn from column 11 via line 12, condensed in condenser 13, and passed into receiver 14. The overhead of fractionating column 11 is maintained at a temperature of about 160° F. and a pressure of about 10 p.s.i.g.

An upper side-cut fraction comprising naphtha boiling range material is withdrawn from fractionator 11 via line 15, pumped by pump 16 through condensers 17 and 18 out of the system as a product stream. If desired, a portion of the naphtha stream in line 15 is returned to fractionator 11 via line 41 as reflux in the upper section of the column. Light hydrocarbon reflux is introduced into column 11 via line 40 from a source more fully discussed hereinafter.

A lower side-cut fraction comprising gas oil boiling range material is withdrawn from column 11 via line 19 and passed into side-cut stripper column 20 having associated therewith reboiler means 27. Sufficient heat is supplied to stripper 20 to remove vaporizable material from the gas oil fraction which is then returned to the column via line 21. The lower side-cut fraction is withdrawn from side-cut stripper 20 via line 22, pumped by pump 23 through heat exchanger 24 for cooling thereof, boiler feed water preheater 25, and air condenser 26 before passing out to storage.

A bottoms fraction comprising residual material is withdrawn from column 11 via line 28, pumped through pump 29 and valve 30, at least in part, through line 31, through reboiler 27 for supplying heat to side-cut stripper 20, and returning through line 32 and 33 for passage out of the system. Preferably, the material in line 33 is recycled entirely to the hydrocracking reaction zone so that for the particular embodiment of this invention no net residual material exits from the process. In other words, for the environment of hydrocracking a relatively heavy feedstock, the bottoms from product fractionator 11 is recycled to extinction.

Returning now to receiver 14 which has collected the condensed overhead fraction: the relatively minor amount of non-condensable material is vented from receiver 14 via line 34 into a flare system. The condensed overhead fraction comprises primarily $C_5$ and $C_6$ hydrocarbons, is withdrawn via line 35 and increased in pressure by pump 36. A net amount of overhead material is recovered from the system via line 37 and passed out to storage. The remaining portion of condensed overhead material is passed via line 38 and then split into at least two additional portions. One portion is returned via line 40 into the upper portion of column 11 and, preferably, into the top of column 11 as reflux thereon. Another portion of the condensed overhead material from line 38 is passed via line 39 into heat exchanger 24, previously mentioned, and into the lower portion of fractionator 11 as a source of the stripping medium therein. Preferably, the condensed overhead fraction is introduced into the bottom of fractionator 11.

It can be seen from this description that fractionator 11 achieves a separation between material boiling from $C_5$ to 1100° F. without the use of steam for stripping purposes in the bottom of the tower. For the particular embodiment of this invention, to wit: the separation of products from the effluent of a hydrocracking reaction zone, the use of light hydrocarbons as a stripping medium in the lower end of the column is particularly advantageous. In the first instance, if light hydrocarbons were not used, nor any stripping used in the bottom of fractionator 11, in all likelihood, a significant amount of gas oil boiling range material would be left in the bottom of fractionator 11. When such material was returned to the hydrocracking reaction zone, it would be converted into normally gaseous hydrocarbons and would represent a net loss in upgraded products from the practice of the hydrocracking reaction. On the other hand, the $C_5$ and $C_6$ material which is injected into the bottom of fractionator 11 is not further converted when passed, if at all, back to the hydrocracking reaction zone.

It should also be noted that steam cannot be used in fractionator 11 since the operating conditions in the overhead of this column are below the dew point of steam and, therefore, there would be no way to eliminate the water from the column except as a contaminant in one of the side-cut product streams. Therefore, the use of steam in fractionator 11 with a feed mixture of this type is not at all desirable.

With reference to the operating conditions which may be maintained in fractionator 11, it is within the practice of this invention for the overhead gaseous fraction to be withdrawn at a temperature from 150° F. to 170° F. and a pressure from atmospheric to 25 p.s.i.g. Similarly, the upper side-cut fraction may be withdrawn at a temperature from 270° F. to 325° F., the lower side-cut fraction may be withdrawn at a temperature from 400° F. to 525° F., and the bottoms fraction may be withdrawn at a temperature from 500° F. to 600° F.

EXAMPLE

Illustrative of the commercial practice of the present invention, when operating under the above described conditions and charging the previously described feed composition, the following products may be obtained:

| | Line No. | | | |
|---|---|---|---|---|
| | 37 | 15 | 22 | 33 |
| Component: | | | | |
| $H_2O$ | | | | |
| $HN_3$ | | | | |
| $H_2S$ | | | | |
| $H_2$ | | | | |
| $C_1$ | | | | |
| $C_2$ | | | | |
| $C_3$ | | | | |
| $iC_4$ | | | | |
| $nC_4$ | 17.92 | | | |
| $iC_5$ | 204.70 | | | |
| $nC_5$ | 15.96 | | | |
| $iC_6$ | 152.29 | | | |
| $C_H$ | 77.44 | | | |
| $C_7$–375° F | | 830.51 | | |
| 375° F.–525° F | | | 222.61 | |
| 525° F.–1,025° F | | | | |
| Resid | | | | |
| Recycle | | | | 270.33 |
| Total | 468.31 | 830.51 | 222.61 | 270.33 |
| Lb./hr | 36,601 | 93,848 | 39,402 | 97,319 |
| Mol. wt | 78.16 | 113.00 | 177.00 | 360.020 |
| B.p.s.d | 3,804 | 8,332 | 3,273 | 7,872 |
| °API | 83.10 | 51.80 | 40.00 | 35.50 |

PREFERRED EMBODIMENT

The preferred embodiment of the present invention is the method for distilling a debutanized hydrocarbon feed mixture boiling mainly within the range from $C_5$ to 600° F. under substantially anhydrous conditions which comprises the steps of: (a) introducing said feed mixture into a fractionating column maintained under distillation conditions including a pressure from atmospheric to 100 p.s.i.g. and the presence of hereinafter specified light hydrocarbon stripping medium; (b) withdrawing from said column an overhead gaseous fraction comprising $C_5$ and $C_6$ hydrocarbons at a temperature from 150° F. to 170° F. and a pressure from atmospheric to 25 p.s.i.g.; (c) withdrawing from said column an upper side-cut fraction comprising naphtha boiling range material at a temperature from 270° F. to 325° F.; (d) withdrawing from said column a lower side-cut fraction comprising gas-oil boiling range material at a temperature from 400° F. to 525° F.; (e) withdrawing from said column a bottoms fraction comprising material boiling mainly above 525° F. at a temperature from 500° F. to 600° F.; (f) condensing said overhead gaseous fraction; (g) introducing a portion of said condensed overhead fraction into the top of said column; (h) introducing a portion of said condensed overhead fraction into the bottom of said column as said specified stripping medium; and, (i) recovering the remainder of said condensed overhead fraction as a product stream.

It is to be noted that the present invention utilizes the condensed material from the overhead of the fractionating column both as reflux and as a stripping medium in the fractionator. Accordingly, as used herein, the term "stripping gas," "stripping medium" is intended to embody broadly the concept of injecting a material form which vapors may be generated either for the purpose of stripping and/or for the purpose of lowering hydrocarbon charge pressure within the column for vaporization purposes. It is not intended that the scope of this invention be limited by a narrow definition of the word "stripping." In addition, the objects of the present invention may be readily achieved when the overhead gaseous fraction is withdrawn from the column at a temperature of less than 200° F. and a pressure of less than 25 p.s.i.g. Those skilled in the art, from the teachings presented herein, will know how to choose the lower operable limits within which fractionator 11 may be operated.

I claim:

1. Method for distilling a debutanized hydrocarbon feed mixture having an end point above 500° F. under substantially anhydrous conditions which comprises:
   (a) introducing said feed mixture into a fractionating column maintained under distillation conditions including superatmospheric pressure and the presence of hereinafter specified stripping gas;
   (b) withdrawing an overhead gaseous fraction comprising $C_5$ and $C_6$ hydrocarbons at a temperature below the dew point of water;
   (c) withdrawing a side-cut fraction having an end point of about 500° F.;
   (d) withdrawing a bottoms fraction boiling mainly above about 500° F.;
   (e) condensing said overhead fraction;
   (f) passing a portion of said condensed overhead fraction into the upper section of said column as reflux thereon;
   (g) passing a portion of said condensed overhead fraction into the lower section of said column as a source of stripping gas specified; and,
   (h) recovering the remaining portion of said condensed overhead fraction as a product stream.

2. Method according to claim 1 wherein said feed mixture comprises a portion of the hydrocarbon effluent of a hydrocracking reaction zone.

3. Method according to claim 2 wherein said bottoms fraction of Step (d) is returned entirely to said hydrocracking reaction zone.

4. Method according to claim 1 wherein said overhead gaseous fraction is withdrawn at a temperature of less than 200° F. and a pressure less than 25 p.s.i.g.

5. Method according to claim 4 wherein said overhead temperature is about 160° F. and said overhead pressure is about 10 p.s.i.g.

6. Method for distilling a debutanized hydrocarbon feed mixture boiling mainly within the range from $C_5$ to 600° F. under substantially anhydrous conditions which comprises the steps of:
   (a) introducing said feed mixture into a fractionating column maintained under distillation conditions including a pressure from atmospheric to 100 p.s.i.g. and the presence of hereinafter specified light hydrocarbon stripping medium;
   (b) withdrawing from said column an overhead gaseous fraction comprising $C_5$ and $C_6$ hydrocarbons at a temperature from 150° F. to 170° F. and a pressure from atmospheric to 25 p.s.i.g.;
   (c) withdrawing from said column an upper side-cut fraction comprising naphtha boiling range material at a temperature from 270° F. to 325° F.;
   (d) withdrawing from said column a lower side-cut fraction comprising gas-oil boiling range material at a temperature from 400° F. to 525° F.;
   (e) withdrawing from said column a bottoms fraction comprising material boiling mainly above 525° F. at a temperature from 500° F. to 600° F.;
   (f) condensing said overhead gaseous fraction;
   (g) introducing a portion of said condensed overhead fraction into the top of said column;
   (h) introducing a portion of said condensed overhead fraction into the bottom of said column as said specified stripping medium; and,
   (i) recovering the remainder of said condensed overhead fraction as a product stream.

7. Method according to claim 6 wherein said lower side-cut fraction is passed into a stripper column having reboiler means associated therewith and passing at least a portion of said bottoms fraction into said reboiler means for supplying the heat requirements for said stripper column.

References Cited

UNITED STATES PATENTS

| | | | |
|---|---|---|---|
| 2,057,004 | 10/1936 | Burkhard | 208—353 |
| 2,108,659 | 2/1938 | Dunham | 208—355 |
| 3,402,124 | 9/1968 | Jones | 208—353 |

HERBERT LEVINE, Primary Examiner

U.S. Cl. X.R.

203—27, 82, 98; 208—102, 103, 353, 356